No. 718,664.  PATENTED JAN. 20, 1903.
A. SHEARER.
COMBINED LISTER PLOW AND PLANTER.
APPLICATION FILED AUG. 23, 1902.
NO MODEL.
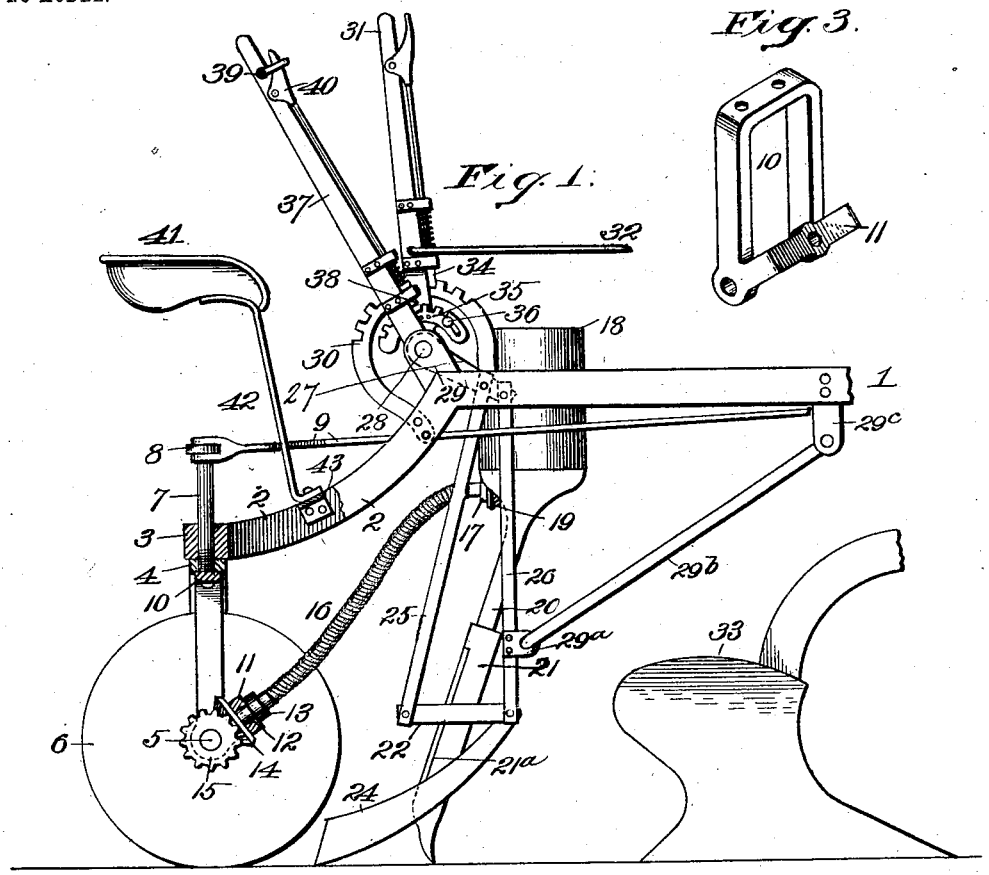
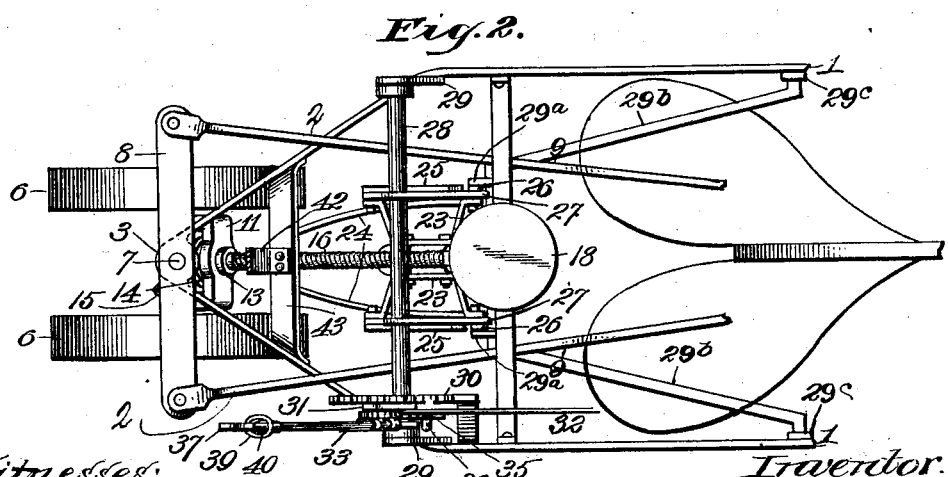
Witnesses:  Inventor:
Andrew Shearer
By Fischer & Thorpe
Attys.

UNITED STATES PATENT OFFICE.

ANDREW SHEARER, OF FRANKFORT, KANSAS.

COMBINED LISTER-PLOW AND PLANTER.

SPECIFICATION forming part of Letters Patent No. 718,664, dated January 20, 1903.

Application filed August 23, 1902. Serial No. 120,786. (No model.)

*To all whom it may concern:*

Be it known that I, ANDREW SHEARER, a citizen of the United States, residing at Frankfort, in the county of Marshall and State of Kansas, have invented certain new and useful Improvements in a Combined Lister-Plow and Planter, of which the following is a specification.

My invention relates to combined lister-plows and planters of the three or four wheel type wherein the lister is adjustable vertically to produce furrows of different depths and the drill deposits the seed on the bottom of such furrows; and my object is to produce a machine of this character of simple, strong, and inexpensive construction which is under perfect control by the driver and whereby when in motion or otherwise the latter may at will raise the drill independently of or with the lister or leave the former to ride upon the ground and free to accommodate itself to the surface of the latter, so as to relieve the draft-animals of all the strain possible.

Other objects having relation to structural characteristics hereinafter appear and are pointed out in the appended claims, and in order that the invention may be fully understood reference is to be had to the accompanying drawings, in which—

Figure 1 represents a view, partly in side elevation and partly in central vertical section, of a combined lister-plow and planter embodying my invention. Fig. 2 is a top plan view of the same. Fig. 3 is a detail perspective view of a casting forming part of the machine.

Referring now to the drawings in detail, a suitable frame embodies side bars 1, which converge at their rear ends, as at 2, and form a central bearing 3. Below said bearing is an arch-frame 4, having a short shaft 5 journaled in its lower ends, and mounted upon said shaft is a pair of wheels 6, one of which at least is rigid with the shaft to turn the latter. Projecting vertically upward from the center of the arch-frame and journaled in bearing 3 of the main frame is a rod 7, surmounted by a lever 8, the ends of said lever being connected to the rear ends of a pair of forwardly-extending rods 9, which as the machine turns are adapted to operate on said lever and turn it to one side or the other, so as to guide said wheels 6. As the present invention, however, has no dependent relation on the style of wheeled frame and its front end connections and as no claim is made to said rods, the mechanism at the front ends of said rods is omitted.

A double-arch casting comprises the vertical arch 10, secured rigidly to and depending from the top of arch 4 and between wheels 6, and the upwardly and forwardly extending arch 11, having a central hole forming a bearing for the short shaft 12, downward movement of said shaft being prevented by collar 13, mounted thereon and bearing against the front or upper side of the inclined arch 11. Mounted upon the lower end of said shaft is a bevel-gear 14, meshing with and driven by a similar gear 15 on shaft 5.

Secured to and forming practically a continuation of shaft 12 is a flexible or coiled-wire shaft 16, the upper end of said shaft being journaled in the bearing 17, depending from the seedbox 18, supported in any suitable manner in the wheeled frame, a similar bevel-wheel 19 on the upper end of said shaft meshing with and operating the seedbox mechanism. (Not shown because of any suitable or preferred type.)

Depending from the seedbox is the rubber spout 20, and telescopically fitting upon the same is the drill-boot 21, having its rear side of open-work or transparent construction 21$^a$ to enable the driver to see the seed as it drops down through said boot, and to further insure this result the boot and flexible spout extend downwardly and rearwardly from the seedbox. The drill-boot extends centrally through the covering-frame 22, the same comprising side bars connected by arch-bars 23, between which the drill-boot is clamped in any suitable or preferred manner, the special type of its construction being unimportant, as I have a separate application pending wherein this structure is more clearly illustrated, said application bearing filing date August 19, 1901, and being serially numbered 72,540.

Secured to and extending convergingly rearward from the front corners of the carrying-frame are the coverers 24, and pivoted at their lower ends to the rear and front corners of said frame are the upwardly-converging links 25 and 26, respectively, the upper ends of said links being pivoted at different distances on the crank-arms 27 from the transverse shaft 28, journaled in bearings 29, secured to the wheeled frame, and pivoted at its rear end to the clasps 29ª, secured to links 26, is a bail 29ᵇ, said bail being pivoted at its front and opposite end to the lugs 29ᶜ, depending rigidly from frame 1, and adapted to swing vertically in accommodation of vertical movement of the drill and at the same time act as a draft-bar to pull the latter along and hold it to its work. Secured to the frame in any suitable manner and arranged concentrically of said shaft 28 is a notched sector 30, and journaled on shaft 28 contiguous to said sector is the main or lister lever 31, a rod 32 extending forwardly from said lever to other suitable connections adapted to raise or lower the lister 33, these connections being omitted because they have no bearing on this invention. Said lever is provided with the usual spring-actuated dog 34 for engagement with the sector to lock the lister in its depressed or elevated position and with a slotted sector 35, having a laterally-projecting pin 37 adjustable in the slot thereof and adapted when the machine-lever is thrown rearward to strike and operate the drill-lever 37, mounted rigidly on shaft 28, the adjustability of pin 36 enabling the operator to throw lever 31 a variable distance before causing the operation of lever 37. The last-named lever is provided with the usual spring-actuated dog 38 for engagement with sector 35 and with a pivoted ring 39 for engagement with the grip 40, whereby said dog is withdrawn from the path of said sector 35, said ring being adapted by engagement with said grip to hold the dog retracted to inoperative position, in which position, if preferable, it may remain during the planting operation. The levers 31 and 37 are within convenient reach of the driver upon seat 41, said seat being secured in the usual manner to the upper end of spring-standard 42, bolted at its lower end to the cross-bar 43 of the wheeled frame.

In practical operation, assuming that the parts are as shown, it will be apparent that the drill mechanism is perfectly free to adapt itself to irregularities in the surface of the ground as long as the lister is performing its function, the seed being dropped in the usual manner through the operation of the gearing described. Should the operator desire to withdraw the drill from the ground without raising the lister, he can do so by simply grasping and pulling downward on lever 37 and then locking said lever in its new position by tripping ring 39 from engagement with grip 40. He can then restore the drill mechanism to its original position by reversing the action just described or by grasping lever 31 and throwing it rearward a sufficient distance to cause pin 36 to strike lever 37 and impart like movement to the same. He can raise the lister and drill to inoperative position simultaneously.

From the above description it will be apparent that I have produced a machine embodying the feature of advantage enumerated as desirable and which is obviously susceptible of modification in minor particulars without departing from its principle and scope or sacrificing any of its advantages.

Having thus described the invention, what I claim as new, and desire to secure by Letters Patent, is—

1. In a machine of the character described, a suitable frame, a drill-carrying frame, a crank mechanism journaled in the first-named frame, to raise and lower the drill-carrying frame, and a lever movable independently of the crank mechanism, and means to interlock said lever with said crank mechanism so as to operate the latter.

2. In a machine of the character described, a suitable frame, a drill-carrying frame, a crank mechanism journaled in the first-named frame, to raise and lower the drill-carrying frame, a lever journaled on the crank mechanism to move independently thereof, and means to interlock said lever with said crank mechanism so as to operate the latter.

3. In a machine of the character described, a wheeled frame, a seedbox therein, a drill-carrying frame below the seedbox, a crank-shaft supporting the drill-carrying frame, a main lever journaled on said shaft and provided with mechanism to lock it at the desired position and carrying a sector, a second lever rigid on said shaft and provided with a dog to engage the last-named sector, and means to hold said dog withdrawn from the sector.

4. In a machine of the character described, a wheeled frame, a seedbox therein, a drill-carrying frame below the seedbox, a crank-shaft supporting the drill-carrying frame, a main lever journaled on said shaft and provided with mechanism to lock it at the desired position and carrying a slotted sector having a pin adjustable in the slot thereof, a second lever rigid on said shaft and in the path of movement of said pin, a dog carried by said second lever and adapted for engagement with the slotted sector, and means to hold said dog withdrawn from the sector.

5. In a machine of the character described, a suitable frame, a drill-carrying frame, a crank mechanism journaled in the first-named frame to raise and lower the drill-carrying frame, a lever movable independently of the crank mechanism, and a pin supported from said lever and capable of engaging and operating said crank mechanism.

6. In a machine of the character described, a suitable frame, a drill-carrying frame, a crank mechanism journaled in the first-named frame to raise and lower the drill-carrying frame, a lever movable independently of the crank mechanism, and a dog-and-sector relation between said lever and crank mechanism.

7. In a machine of the character described, a suitable frame, a drill-carrying frame, a crank mechanism journaled in the first-named frame to raise and lower the drill-carrying frame, a lever movable independently of the crank mechanism, a dog-and-sector relation between said lever and crank mechanism, and means to lock the lever at the desired point of adjustment.

8. In a machine of the character described, a suitable frame, a drill-carrying frame, a crank-shaft connected to the drill-carrying frame, a dog supported from and movable with the crank-shaft means to operate the crank-shaft, a lever provided with a sector to engage said dog, and means to secure said lever at the desired point of adjustment.

In testimony whereof I affix my signature in the presence of two witnesses.

ANDREW SHEARER.

Witnesses:
  MICHAEL GRIFFIN,
  DUDLEY CURRY.